2,817,482

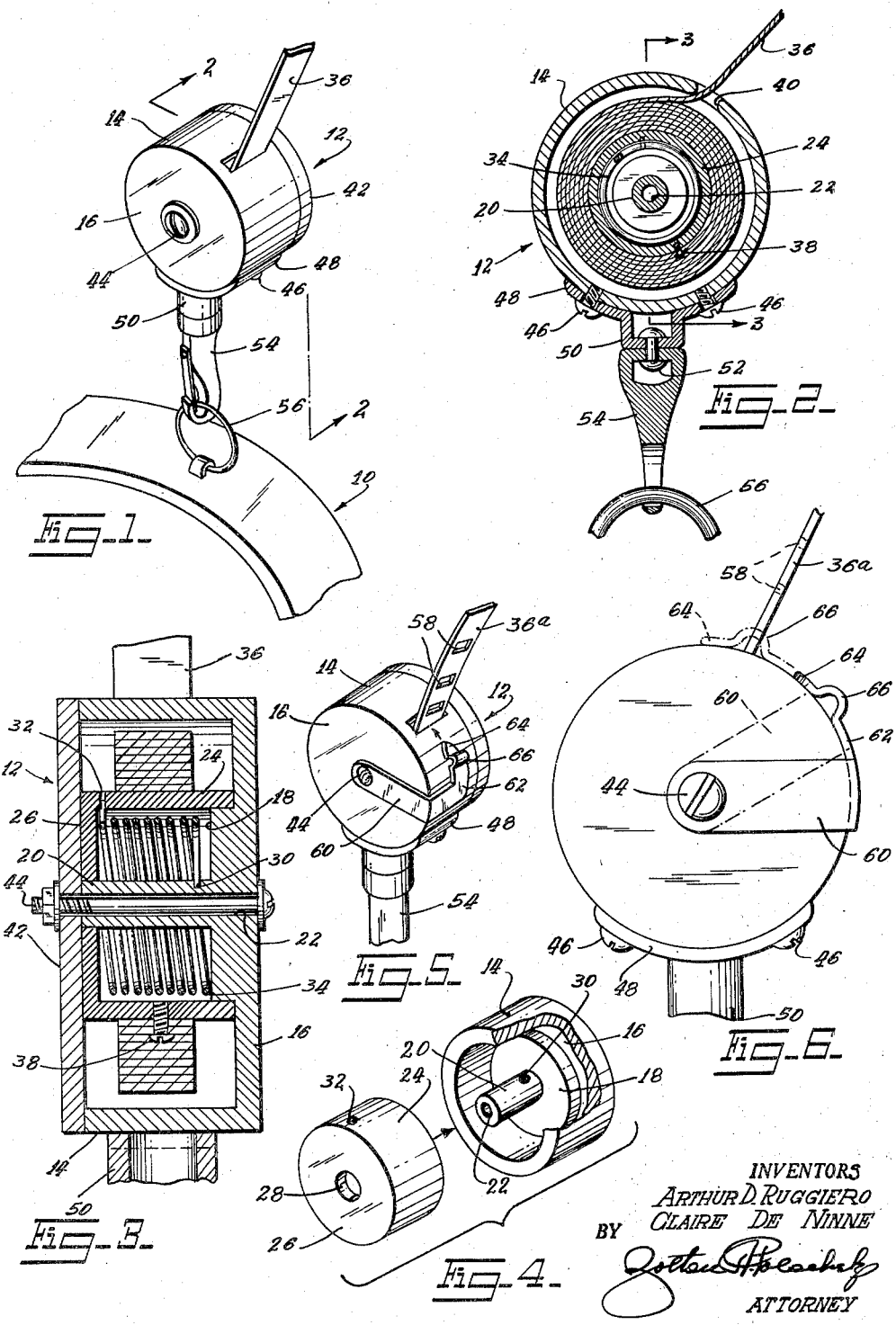

RETRACTABLE DOG LEASH ATTACHMENT FOR DOG COLLARS

Arthur D. Ruggiero and Claire De Ninne, New Rochelle, N. Y.

Application February 2, 1955, Serial No. 485,662

2 Claims. (Cl. 242—107.2)

This invetnion relates to a dog leash and, more particularly, to a leash retractable into a small casing attachable to a dog collar.

One important object is to provide a leash, casing, and spring-wound reel on which the leash is coiled, assembled into a compact, small unit inconspicuously attached to a dog collar.

Another object of importance is to so form the several parts of the assembly as to facilitate measurably their individual manufacture and their interconnection, at minimum expense.

Still another object is to provide means on the casing for attaching the same to the dog collar, which means will be freely pivoted upon the dog collar and will be loosely swiveled thereon, thereby to permit a wide latitude of movements of the dog, without entanglement of the leash.

Another object, in one form of the invention, is to provide a latch means on the casing which whenever desired can be shifted into engagement with the leash in selected positions to which the leash is extended out of the casing against the restraining force of the spring. In this way, it is proposed to permit the user, whenever he or she should so desire, to at times maintain the leash under spring bias tending to coil the same, thereby to permit the dog leash to be continuously extended and retracted according to the movements of the dog toward and away from his master, and at other times to permit the leash to be extended a selected distance, and then retained in the selected position of adjustment.

A further object, in said one form of the invention, is to so design the latch as to permit it to be used as an attachment to the device. In this way, it is proposed to permit the manufacture of the device either with or without the latch, the addition of the latch being effected without requiring modification or redesign of the casing, reel, or other metal or hard plastic parts.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the device attached to a dog collar, said collar and the leash element being illustrated fragmentarily.

Fig. 2 is an enlarged sectional view on line 2—2 of Fig. 1.

Fig. 3 is a sectional view, still further enlarged, on line 3—3 of Fig. 2.

Fig. 4 is an exploded perspective view of the casing and reel, a portion of the casing being broken away.

Fig. 5 is a perspective view, portions being broken away, of a modified construction.

Fig. 6 is a front elevational view, on an enlarged scale, of the modified form.

In Fig. 1, there is illustrated a conventional dog collar 10 having the leash 12 constituting the present invention attached thereto. The leash includes a cylindrical, flat casing 14 which, in a commercial embodiment, need not be any greater than perhaps one and one-half inches in diameter, thus to be relatively inconspicuous when attached to the collar. The casing can be of metal or molded plastic, and is open at one side, the other side being permanently closed by a flat wall 16 the inner surface of which is formed with a low, circular, flat boss 18 integral at its center with an elongated, cylindrical shaft 20 extending axially of the casing and terminating at its outer end in the plane of the open side of the casing. An axial bore 22 is formed in the shaft, opening at one end upon the outer end of the shaft and at its other end through the wall 16.

A cylindrical reel 24, substantially smaller in diameter than the casing, has a flat end wall 26, the other end of the reel being formed open and rotatably bearing against the inner surface of wall 16 in the assembled condition of the parts. The boss 18 is if a diameter equal to the inner diameter of the reel 24, so as to provide a bearing for the reel at the open end of the reel. At its other, closed end, the reel has a center opening 28 formed in the wall 26, of a diameter corresponding to the outer diameter of shaft 20, and receiving the outer end of the shaft, so that the reel is provided with bearings at its opposite ends by the boss 18 and shaft 20 respectively. Formed in shaft 20 adjacent its inner end is a small recess 30, while formed in reel 24, adjacent its closed end, is an equally small opening 32. Engaged in the recess 30 and opening 32 are the opposite ends of a coil spring 34, maintained under moment tending to unwind the same, thereby to rotatably bias the reel 24 in one direction about the axis thereof.

A flat leash element 36 of flexible plastic, thin leather, or other strong but light, thin material is coiled upon the reel, and at its inner end is fixedly secured to the reel by a screw 38 or equivalent means. The spring, tending to unwind, rotates the reel in a direction to normally coil the leash element thereabout, so that the leash element is normally retracted. The leash element extends through a slot 40 formed in the side wall of the casing 14, and at its outer end would be provided with the usual loop handle or the like.

After the cashing, spring, reel, and leash element have been assembled in the manner described, a cover 42 is applied to the open end of the casing, and has a center opening registering with bore 22 to receive a screw 44, a nut being threaded on the screw against the cover so as to fixedly engage the cover against the open end of the casing. It will be understood that the cover does not bear so tightly against the reel 24 as to inhibit the free rotational movement thereof.

Means to attach the casing to the dog collar 10 includes a swivel element and a snap type clasp. Screws 46 are threaded into tapped openings spaced circumferentially of side walls 14, through smooth-walled openings formed in the opposite ends of an arcuate base flange 48 of a hollow, cylindrical swivel base 50, having a center opening receiving a rivet 52 on which is fereely rotatable the base portion of a snap clasp 54, adapted to receive a metal ring 56 pivoted upon the collar 10. By reason of this arrangement, the casing can rotate bodily about the axis of rivet 52, while the clasp, itself, can shift circumferentially of the ring and can also freely pivot upon the ring. A wide latitude of movements of the dog is thus permitted.

In use, the device is attached as shown in Fig. 1, and the dog, whenever it moves away from its master, will cause the reel to unwind against the restraint of the spring, so that the leash, though maintained taut, is continuously shortened or increased in length, depending upon the dog's movements.

In Figs. 5 and 6 there is shown a modification wherein all parts of the invention are formed exactly as hereinbefore described, with the exception of the leash element 36ª. In the modified form this has longitudinally spaced, transversely extending slots 58.

In the modification, a latch means is formed of a single piece of flat metal material shaped to include an arm 60 having at one end an opening receiving screw 44, said arm extending in contact with and projecting radially of the flat wall 16 of the casing. The arm terminates shortly beyond the periphery of the casing, and at its outer end is formed with a lateral extension 62 extending inwardly of the casing in contact with the cylindrical side wall thereof. Arm 62 is transversely curved correspondingly to the curvature of the side wall of the casing, and terminates medially between the opposite, flat ends of the closed casing. At its free end, extension 62 is integrally formed with a latching projection 64 curved correspondingly to the curvature of the casing side wall, so as to be maintained in slidable contact therewith during rotation of the latch about the axis of the screw 44 between the full and dotted line positions shown in Fig. 6. The projection 64 at its free end is pointed to facilitate its entrance through a selected one of the slots 58, and intermediate its ends, the projection 64 has a transversely extending crimp or corrugation 66 formed therein.

The screw head is tightened against the arm 60 to an extent sufficient to cause the arm, when said arm is in the full line position thereof shown in Figs. 5 and 6, to bear frictionally against the adjacent wall of the casing, thus to hold the arm in position upon the casing, ready for use. However, it is not essential that the arm be so frictionally engaged, and if desired, it can depend loosely from the screw 44. In any event, whenever it is desired to use the leash in the manner previously described herein, the latch means is left out of engagement with the leash element 36ª.

Should, however, it be desired to extend the leash to a selected extent, and then hold it in the adjusted position so that it will remain of unvarying, adjusted length, one simply shifts the latch element in the direction shown by the arrow in Fig. 5, through a selected slot 58, the projection moving through the slot and the crimp engaging in the slot in the final position of the latch shown in dotted lines in Fig. 6. The crimp prevents the latch element from accidentally moving out of the selected slot, and of course, the leash member is at the same time under spring bias tending to pull the same inwardly of the casing, thereby to more firmly engage the same with the latch means.

An important characteristic of the modified construction resides in the fact that the latch means is provided without modification of the casing, cover, or reel, in any way. The latch means is applied simply by removing the screw 44 and then reinserting it through the opening in the inner end of the latch arm. When the device is used with a latch, of course, a leash having slot-like openings 58 would be used in place of an imperforate leash.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A leash for attachment to a dog collar, comprising a casing having a slot, a reel rotatable in the casing, spring means interposed between the casing and reel under moment tending to rotate the reel in one direction, a leash element secured to the reel so as to be coiled thereon when the reel is so rotated, said element extending through the slot, and means on the casing to attach the same to said collar, said casing being of cylindrical formation and being permanently closed at one end, the other end of the casing being formed open, the casing including a removable cover overlying the open end thereof, the casing and cover having center openings, said leash additionally including a connecting screw extending through said center openings to engage the cover against said open end, said leash further including latch means movably mounted exteriorly of the casing for movement into engagement with said leash element in selected positions to which the leash element is extended out of the casing, said latch means being pivoted upon said screw, and including an arm receiving the screw at one end and extending radially of the casing, a lateral extension on the other end of the arm overlying the side wall of the casing, and a projection on said lateral extension extending circumferentially of the casing to engage the leash element on pivoting of the arm upon said screw in one direction, the leash element being formed with a longitudinal series of openings in one of which said projection is engageable, and means for preventing pivotal movement of the latch means out of its element-latching position.

2. A leash for attachment to a dog collar, comprising a casing having a slot, a reel rotatable in the casing, spring means interposed between the casing and reel under moment tending to rotate the reel in one direction, a leash element secured to the reel so as to be coiled thereon when the reel is so rotated, said element extending through the slot, and means on the casing to attach the same to said collar, said casing being of cylindrical formation and being permanently closed at one end, the other end of the casing being formed open, the casing including a removable cover overlying the open end thereof, the casing and cover having center openings, said leash additionally including a connecting screw extending through said center openings to engage the cover against said open end, said leash further including latch means movably mounted exteriorly of the casing for movement into engagement with said leash element in selected positions to which the leash element is extended out of the casing, said latch means being pivoted upon said screw, and including an arm receiving the screw at one end and extending radially of the casing, a lateral extension on the other end of the arm overlying the side wall of the casing, and a projection on said lateral extension extending circumferentially of the casing to engage the leash element on pivoting of the arm upon said screw in one direction, the leash element being formed with a longitudinal series of openings in which said projection is engageable, the projection being formed with a transverse crimp intermediate its ends, said crimp extending through a selected opening of the leash element to engage the latch means against pivotal movement out of its element-latching position.

References Cited in the file of this patent
UNITED STATES PATENTS

| | | |
|---|---|---|
| 2,222,409 | Gottlieb | Nov. 19, 1940 |
| 2,250,171 | Wilkins | July 22, 1941 |
| 2,549,098 | Joseph | Apr. 17, 1951 |
| 2,647,703 | Hayes | Aug. 4, 1953 |
| 2,658,234 | Trammell et al. | Nov. 10, 1953 |
| 2,705,115 | Ewing | Mar. 29, 1955 |